US007277213B2

(12) United States Patent
Watson et al.

(10) Patent No.: US 7,277,213 B2
(45) Date of Patent: Oct. 2, 2007

(54) APERTURE PLATE AND RELATED SYSTEM AND METHOD

(75) Inventors: Mathew D. Watson, Bellevue, WA (US); Christopher A. Wiklof, Everett, WA (US)

(73) Assignee: Microvision, Inc., Redmond, WA (US)

( * ) Notice: Subject to any disclaimer, the term of this patent is extended or adjusted under 35 U.S.C. 154(b) by 0 days.

(21) Appl. No.: 11/003,179

(22) Filed: Dec. 3, 2004

(65) Prior Publication Data

US 2006/0119919 A1 Jun. 8, 2006

(51) Int. Cl.
*G02B 26/10* (2006.01)

(52) U.S. Cl. ....................... 359/214; 359/613; 359/636

(58) Field of Classification Search ................ 359/196, 359/212–214, 224, 225, 602, 613, 636, 839; 347/256, 259, 260

See application file for complete search history.

(56) References Cited

U.S. PATENT DOCUMENTS 2,086,293 A * 7/1937 Chevalier ........................ 2/12
3,791,722 A * 2/1974 Ahlberg et al. ............... 351/45
4,923,293 A * 5/1990 Nelles et al. ............... 359/364
5,161,238 A 11/1992 Mehmke et al.
5,467,104 A 11/1995 Furness, III et al.
5,629,790 A 5/1997 Neukermans et al.
6,896,377 B2 * 5/2005 Rash et al. ................. 359/613
2001/0026394 A1 10/2001 Kawamura
2002/0054433 A1 5/2002 Taklind et al.

FOREIGN PATENT DOCUMENTS

EP 1 258 743 A 11/2002
GB 695 747 A 8/1953
JP 06 202034 A 7/1994

OTHER PUBLICATIONS

PCT International Search Report for corresponding International Application No. PCT/US2005/043964 mailed Aug. 9, 2006.

* cited by examiner

*Primary Examiner*—Mark A. Robinson
(74) *Attorney, Agent, or Firm*—Graybeal Jackson Haley

(57) ABSTRACT

An aperture plate includes an opening and a surface adjacent to the opening. The opening passes electromagnetic energy such as light to a reflector that is aligned with the opening and that directs the electromagnetic energy to a location. The surface reflects incident electromagnetic energy away from the location in a direction that is outside of the range of directions. Such an aperture plate insures that electromagnetic energy, e.g., light, strikes only the desired portions of the reflector, and that peripheral light that is outside of the aperture opening is reflected away from the location, e.g., display screen, toward which the reflector directs the electromagnetic energy. Furthermore, because such an aperture plate is mounted near the reflector, the alignment tolerances are typically less stringent than for an aperture plate mounted near the energy source.

14 Claims, 8 Drawing Sheets

MERGED-MULTIPLE SOURCE LIGHT BEAM 54
50
α=60°
24
66
34
64
52
28
27a
27b
30
Scan Path
Beam Width
66 64
27d
27
27c
24
t
d
26
56
58
94
98
96
99

APERTURE PLATE AND RELATED SYSTEM AND METHOD

BACKGROUND OF THE INVENTION

Scanned beam displays and image-capture devices have been developed to produce high-resolution images. As shown in FIG. 1, a modulated source 10 of light, which may include a modulated point source of light, is formed into a source beam 13 by optics, e.g., a focus lens 12, and directed by the lens onto a moving scan mirror 14, which reflects the beam onto an image curve or plane, such as a display screen 16, to create a viewable image. The mirror 14 may also scan the beam 13 directly into a viewer's eye (not shown in FIG. 1) to create the image directly on the viewer's retina. One application of this latter technique is for use in a head-worn personal display system, such as described in U.S. Pat. No. 5,467,104, entitled VIRTUAL RETINAL DISPLAY (VRD), which is incorporated by reference. Furthermore, the mirror 14 may be a bi-axial microelectromechanical scanner (MEMS) that scans the beam in a raster pattern. Such a MEMS is described, for example, in U.S. Pat. No. 5,629,790 entitled MICROMACHINED TORSIONAL SCANNER, which is incorporated herein by reference.

Still referring to FIG. 1, an aperture 18 may be placed away from the scan mirror 14, here intermediate the lens 12 and the mirror, to block unwanted light as indicated at 20 and to confine the beam 13 to a clear-optical-quality area of the mirror 14. Ideally, the beam 13 has a cross section equal to the cross section of the clear-optical-quality surface of the scanning mirror 34 at the scanning mirror. Generally, the wider the beam 13 at the scanning mirror 34, the smaller the achievable cross section of the beam at the image display 16, and hence the greater the resolution that the displayed image can have.

Typically, the cross section of the beam is expanded to be no larger than the area of the clear-optical-quality surface of the mirror 34, which is the area of the mirror having high optical quality. This is because the often poor-optical-quality perimeter of the mirror 34 and structure that supports the mirror (e.g., MEMS torsion arms) may scatter or otherwise reflect light from the periphery of the beam 13 (i.e., light that strikes beyond the boundary of the clear-optical-quality surface of the mirror) into the image, and thus create visible image artifacts. Because the mirror-support structures often have surfaces that lie in planes that are parallel to the planes that the mirror 34 moves through, these structures often cause bright spots in portions of the image. For example, if a mirror-support structure is coplanar with the at-rest (i.e., zero) scan position of the mirror 14, then peripheral beam light reflected by the structure may cause the center of the image to appear brighter than the periphery of the image. The perceived brightness of the image is the eyes' integration of the brightness of the scan beam 13 over the area of the image. That is, the scanning of the beam 13 "spreads out" the brightness of the beam over the area of the image. But because light reflected from the mirror-support structures is not scanned, the eyes do not integrate this light over the area of the image. Consequently, this reflected light may cause bright spots in the image. Even a relatively small amount of this unwanted reflected light can cause a visible artifact in the viewed image.

One way to limit or eliminate the peripheral light from the beam 13 that is outside the clear-optical-quality surface of the mirror 14 is to use the aperture plate 18, which is an opaque plate that defines an opening 22 through which the beam 13 propagates. The placement of the aperture plate 18 involves a number of considerations. One placement is as shown in FIG. 1, in the beam path between the lens 12 and mirror 14. The aperture plate 18 thus allows only a certain portion of the beam 13 to propagate through to the mirror. The size of the opening 22, which defines the size of the beam 13, can be calculated based on the distance along the optical path from the source 10 to the mirror 14 and on the focal length of the lens 12 so that the beam 13 fills the optical-quality surface of the mirror 34 completely but does not extend beyond this surface. Although the aperture plate 18 is shown between the mirror 14 and the lens 12, the aperture plate can also be located between the source 10 and the lens.

However, there are imaging systems where the placement of the aperture plate is more constrained. For example, if the system includes multiple sources 10 of light such as in certain types of color display or image capture systems, then the distance that the aperture plate can be from the sources on the source side of the lens 12 is limited by where the light from one source 10 overlaps the light from an adjacent source. That is, light from one source 10 may "leak through" the aperture-plate opening for another source—the aperture plate typically has one opening per source. The phenomenon of light from one source "leaking through" the aperture-plate opening for another source is often called cross talk. Many imaging systems include more than one light source. A color imaging system often uses different colored sources for creating full-color images. Furthermore, some systems include multiple sources of each primary color. For example, such systems may include 13 blue sources 10 to create 13 blue scan beams, 13 red sources 10 to create 13 red scan beams, and 26 green sources 10 to create 26 green scan beams. And these light sources 10 are often LEDs, not lasers. Because many LEDs radiate light over a range of angles, cross talk can be even more of a problem where LEDs are used, and thus aperture-plate placement in such systems may be constrained.

To prevent beam cross talk in scanned-beam systems having multiple sources 10, aperture plates are often placed in one of two locations: 1) close enough to the sources 10 so that light from one source does not propagate through the aperture opening of another source; and 2) close to the scan mirror (much closer than shown in FIG. 1) so that the aperture plate will not interfere with proper beam formation.

Locating an aperture plate close to the sources 10 may require precision in manufacture. For example, the distances between adjacent sources 10 may be on the order of 300 microns, and the diameters of the aperture-plate openings may be on the order of 10 microns. The alignment tolerance of the aperture openings relative to the sources 10 may be on the order of 6 microns. While it may be possible to manufacture an imaging system with such an aperture-plate alignment precision, the cost and difficulty may be prohibitive. Also, such designs may also impose restrictions on design of a corresponding lens assembly.

An aperture plate located close to the scan mirror may reflect the light from the periphery of the beams into the viewer's field of view, and thus cause artifacts in the image as discussed above. In such a location, the aperture plate is or is approximately parallel with the mirror in its rest position. Therefore, as discussed above, the plate may reflect peripheral light from the beams into the center of the image, and thus cause the center of the image to appear brighter than the periphery of the image. Even if the plate has an anti-reflective coating, it may still reflect enough of the peripheral light to create a visible artifact in the image.

SUMMARY OF THE INVENTION

An aperture plate includes an aperture opening and a surface adjacent to the opening. The opening passes electromagnetic energy to a reflector that is aligned with the opening and that directs the electromagnetic energy to a location. The surface deflects incident electromagnetic energy away from the location.

The aperture plate blocks at least a portion of electromagnetic energy, e.g., a light beam, from striking undesired portions of the reflector, and the plate surface deflects peripheral energy in one or more directions that are different from the direction or directions in which the reflector directs the energy. Furthermore, because such an aperture plate is mounted near the reflector, the alignment tolerances may be relaxed relative to an aperture plate mounted near a light source. This may reduce the cost and/or difficulty of manufacturing an imaging system.

DETAILED DESCRIPTION

Figure 2:
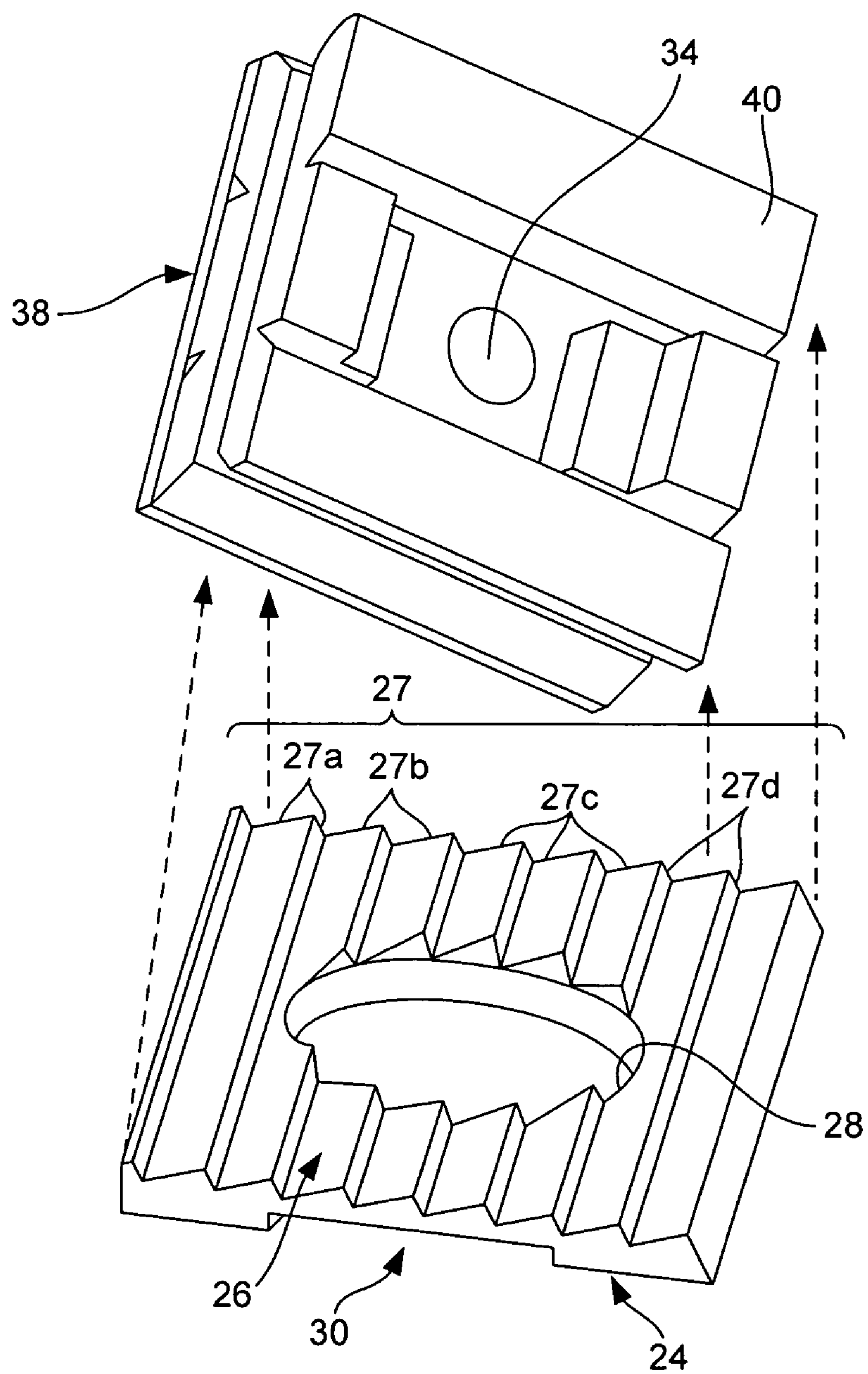
FIG. 2 is an exploded isometric view of an aperture structure according to one embodiment of the invention combined with a MEMS scan mirror assembly.

Referring to FIG. 2, an aperture plate 24 has a surface treated to absorb peripheral light or direct peripheral light away from a viewer's field of view. By directing the peripheral light away from the viewer's field of view, the plate 24 may eliminate or reduce the intensity of image artifacts, such as viewable bright spots. Treatments include providing a patterned surface.

Figure 3:
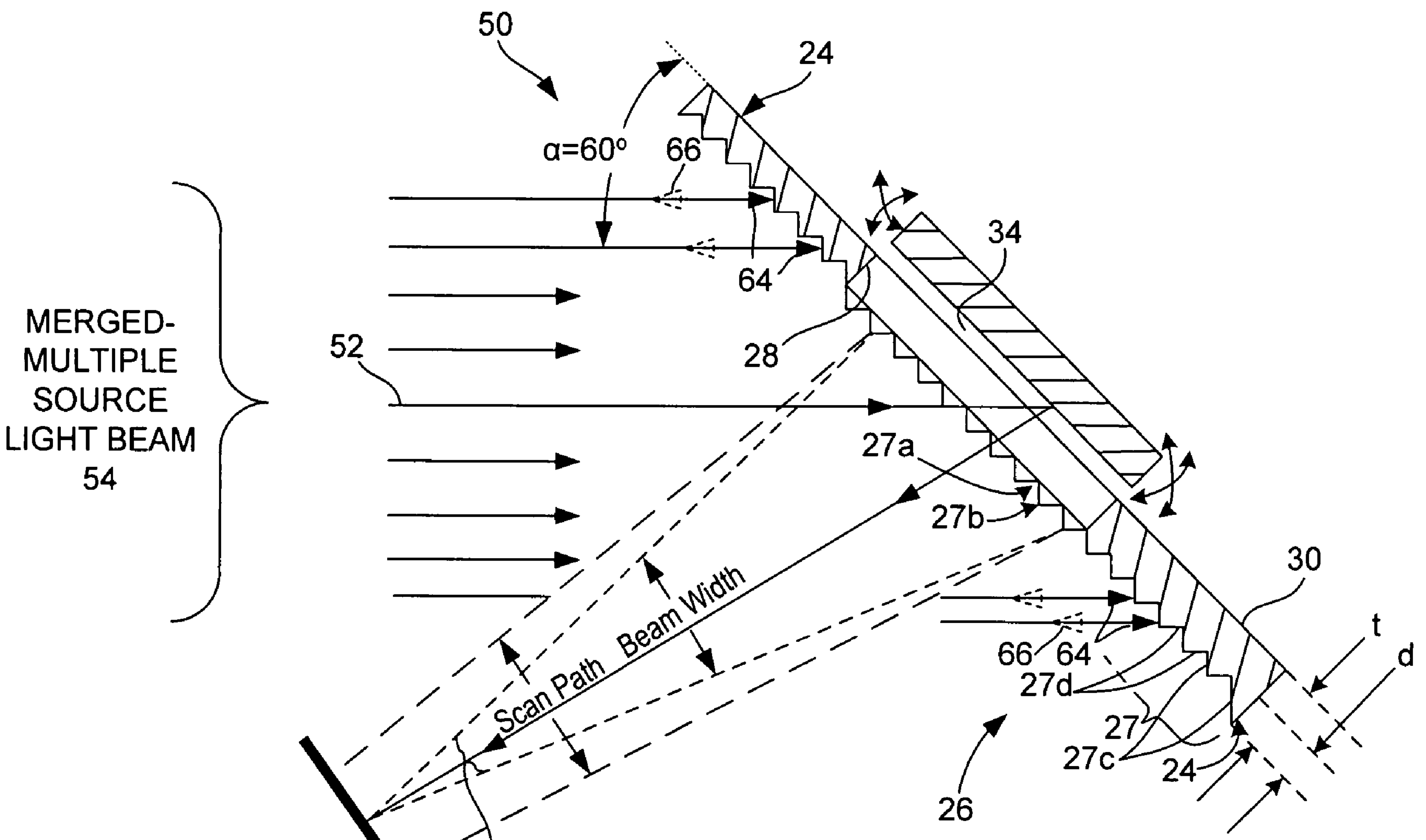
FIG. 3 is a diagrammatic view of an aperture plate and scan mirror according to the embodiment of FIG. 2 receiving and reflecting a source beam of light to create an image in a target field of view.

With further reference to FIG. 2, the exemplary aperture plate 24 has formed on one face an angled surface structure 26, which surrounds a central aperture opening 28. A MEMS mirror 34 is contained within a housing 38, which has an open or transparent top 40 onto which the aperture plate 24 is mounted with the aperture opening 28 in optical alignment with the mirror 34 and the angled surface structure 26 facing away from the mirror toward a source beam of light as illustrated in FIG. 3. When so assembled, the plane of a face 30 (opposite structure 26) of the aperture plate 24 is substantially parallel to the mirror 34 in its rest position, and is mated to the MEMS housing top 40 and secured by suitable means such as epoxy adhesive. As is well known, the MEMS mirror 34 has attached torsion arms (not shown) and related parts for moving the mirror in a bi-axial motion such that the mirror sweeps the reflected scan beam in a raster pattern across the field-of-view of the image-capture device or the display target (e.g., a screen or retina, not shown in FIG. 2).

Referring to FIG. 3, the operation of a multiple-source light scan display system or image capture system 50, which includes the components of FIG. 2, is discussed according to an embodiment of the invention. In the system 50, the mirror 34 and the aperture plate 24 are canted to the mean optical axis 52 of a beam 54 formed from one or more sources of light—i.e., the beam 54 may be a combination of multiple beams, each propagated from a respective light source. Alternatively, a plurality of beams may be combined by a beam combiner and the beam 54 may be a combined beam from the light sources. Here for example the canting is at an angle $\alpha=60°$. As a result of this canted orientation, the MEMS mirror 34, when in its rest position, reflects the beam 54—the reflected beam 54 has a center ray 56—onto a field-of-view or screen 58, which may be a viewer's retina. The mirror 34 rotates back and forth about two orthogonal axes to sweep the reflected beam 54 in two dimensions about the rest-position angle to scan an image on the screen 58 or to sequentially illuminate spots in a field-of-view 58, which may be useful, for example, for capturing an image therefrom. The volume that the beam 54 sweeps out is the scan path, field of view (FOV) which is the same as the where the screen 58 is a viewer's retina.

The opening 28 of the aperture plate 24 passes the desired main portion of the incident beam 54 to the clear quality area of the mirror 34, and the patterned surface structure 26 of the aperture plate absorbs and/or deflects peripheral portions of the beam away from the screen 58. More specifically, the angled surface structure 26 of the aperture plate 24 intercepts the blocked peripheral light 64 and is configured and oriented so that any unwanted deflections 66 off this otherwise anti-reflective structure are directed away from the screen or field-of-view 58.

The surface structure 26 of the exemplary aperture plate 24 includes an array of saw-tooth-shaped channels 27 having alternating valleys 27*a* and ridges 27*b*, and side walls 27*c* and 27*d* (see also FIG. 2) that meet at right angles. The side walls 27*c* are wider than the side walls 27*d* and are angled roughly 90 degrees relative to the beam axis 52 to directly deflect peripheral light from the beam 54 back toward the source as indicated by arrows 66. The depth (d) of the channels 27 is, for example, less than about ¼ to ¾ of the thickness (t) of the relatively thin aperture plate 24. The number of channels 27 can be decreased or increased. By increasing the number of channels 27, there will be a corresponding decrease in the depth (d) so that the surface may appear as textured with many fine shallow channels. As discussed further below, the surface structure 26 has substantially no flat surface areas (i.e., side walls 27*d* and 27*c*) that are parallel to the plane of the mirror 34 while the mirror is in any of its beam-sweep positions. Consequently, substantially no light reflected by the surface structure 26 strikes the screen 58.

Alternatively, the sidewalls 27*c* and/or 27*d* can be set to a different angle to deflect peripheral light away from the screen or field-of-view 58. According to a second alternative, the sidewalls 27*c* and/or 27*d* may be formed at a variable angle to distribute stray light more evenly across the screen or field-of-view 58. Such an arrangement may be used to advantage, for example, by increasing the brightness of the illuminated field-of-view in an image capture system using otherwise wasted light, thus aiding in aiming. According to another alternative, the surface structure 26 of aperture plate 24 may be formed to direct non-scanned light to form one or more aiming features (e.g., an "X" or a dot at the center of the field-of-view, an "L" defining each corner, or a frame surrounding the field-of-view) to aid in positioning an image capture or display device. Because such projected features create a substantially DC scattered light signal, such light can be prevented from affecting a captured image by AC-coupling the detection system. One skilled in the art will recognize that a variety of other angles and orientations may be implemented depending upon the particular configuration and system.

One way to form the channels 27 in the aperture plate 24 is to wet etch the channels, such as when the plate is formed from silicon. Wet-etched surfaces are often highly specular and may permit accurate control of where the stray light is diverted away from the screen 58. Other fabrication processes can be used, however. Such processes include molding as discussed below for the embodiments of FIGS. 6 and 7, micromachining, casting, or other appropriate fabrication techniques.

As discussed above, the exemplary surface structure 26 of the aperture plate 24 can substantially reduce or eliminate residual reflections from the aperture plate onto the screen 58. Without the channels 27, the surface of the aperture plate 24 would be parallel to the plane of the mirror 34 in its resting position, and, therefore, reflections from the aperture plate might cause visible artifacts in the center of the image. Furthermore, if the flat surface of the aperture plate 24 were parallel to any plane through which the mirror 34 rotates while sweeping the beam 54, then the plate might cause visible artifacts in the corresponding portion of the image. And, as discussed above, merely providing an anti-reflective coating and diffuse scattering on such a flat surface when parallel to the mirror may not prove sufficient for some applications. Such an approach relies primarily on increases in light absorption and diffuse scattering, and may present fabrication difficulties or reduce image quality, such as contrast ratio). Anti-reflective coatings with reflectances as low as or lower than 10% can cause visible artifacts in the scanned image. The channels 27 can reduce the level of reflectance of peripheral light onto the screen 58 by an order of 100, 1000, or more. The channels 27 may additionally be treated with a suitable anti-reflective coating to further reduce peripheral light onto the screen 58. Suitable anti-reflective coatings for the aperture plate 24 include fine ground Si that can be further blackened according to known processes.

Still referring to FIGS. 2 and 3, the scan mirror 34 is located slightly below the opening 28 of the aperture plate 24, such as by a fraction of a millimeter to a few millimeters. The opening 28 has substantially the same shape as the mirror, in this case circular or round, and has the same or approximately the same size as the clear-optical-quality region of the mirror so that the aperture plate 24 covers the low-optical-quality perimeter of the mirror.

Mounting of the aperture plate 24 on the MEMS housing 38 is adjusted to provide enough clearance (the fraction to a few millimeters clearance discussed in the preceding paragraph) above the mirror 34 to give it room to scan without hitting the aperture plate. The aperture plate 24 is thin enough so that reflections off the side of the aperture opening 28 do not cause visible artifacts in the image. Although not shown in FIGS. 2 and 3, the sidewall of the opening 28 can also include one or more channels 27 or other surface structures to deflect any unwanted light away from the screen 58.

Figure 1:
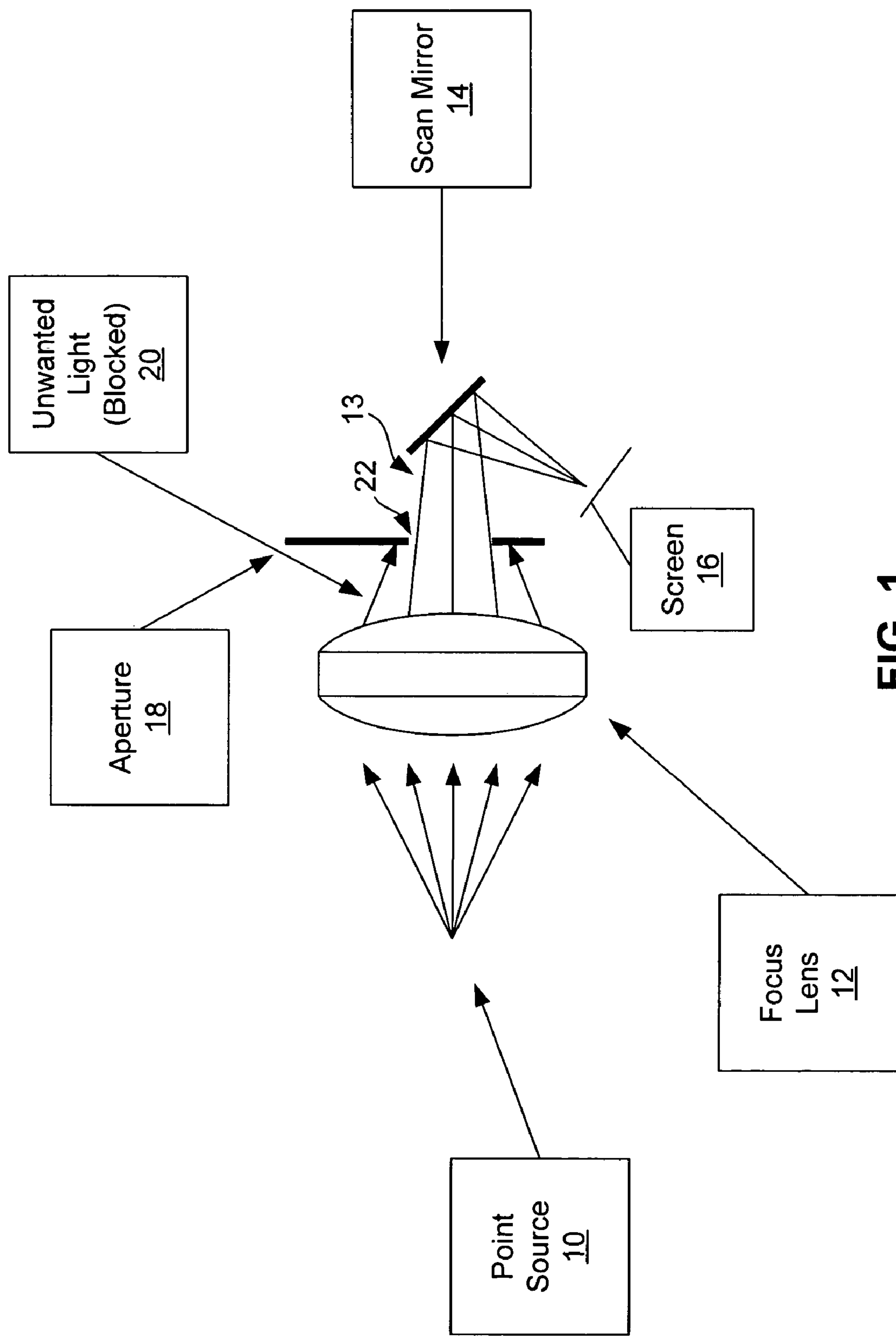
FIG. 1 is an illustration of a conventional imaging system.

Because the aperture opening 28 has approximately the same size as the mirror 34, the alignment tolerances of the aperture plate 24 relative to the mirror are less stringent than the alignment tolerances of an aperture plate on the source side of the focusing optices (e.g., the lens 12 of FIG. 1), particularly where there are multiple sources. Consequently, the manufacture of the system 50 is typically less complex and costly than a system that includes a source-side aperture plate.

Still referring to FIGS. 2 and 3, other embodiments of the system 50 and of the aperture plate 28 are contemplated. For example, although the axes of the channels 27 are shown normal to the page of FIG. 3, the aperture plate 24 can be rotated about the opening 28 to any other orientation without degrading the ability of the sidewalls 27*c* and 27*d* to deflect peripheral light away from the screen 58. Furthermore, although the aperture plate 24 is shown canted 60 degrees relative to the beam axis 52, the channels 27 may be modified such that the plate (and mirror rest position) can be canted at other angles relative to the beam axis. Furthermore, the angle at which the side walls 27*c* and 27*d* meet may be altered.

Figure 4A:
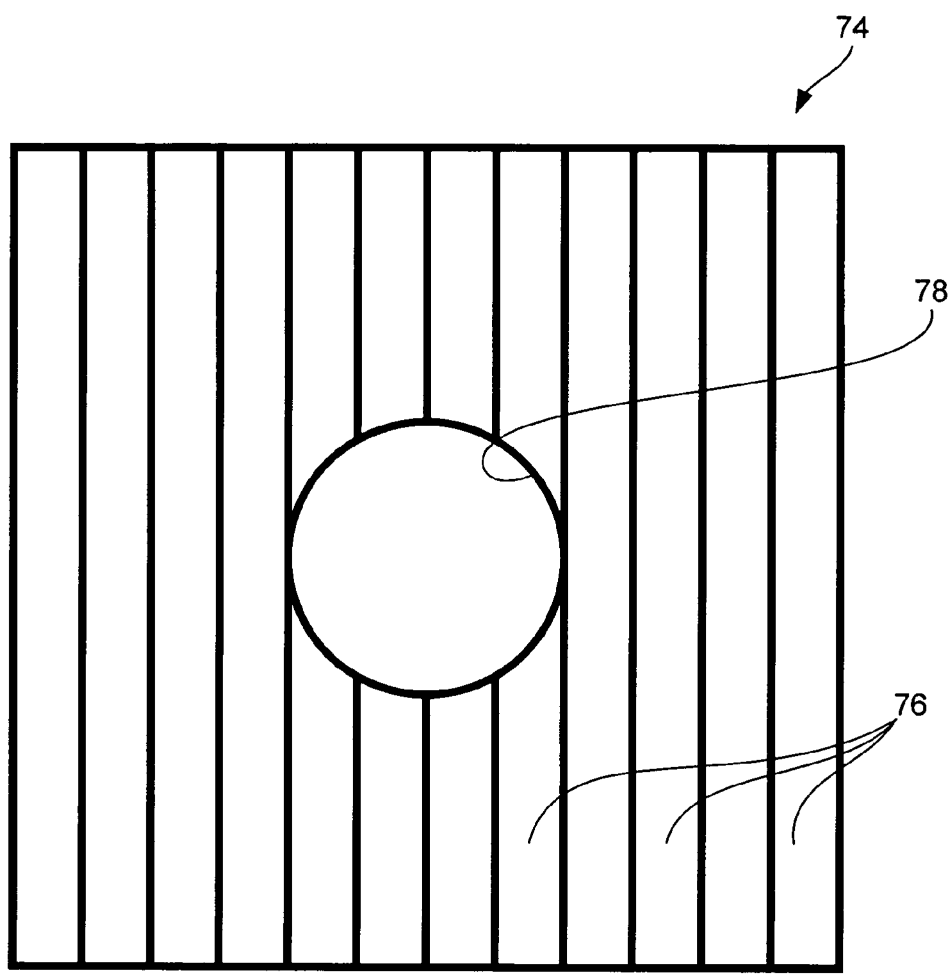
FIGS. 4A and 4B are plan and end views, respectively, of an embodiment of the aperture plate according to another embodiment of the invention.
Figure 4B:
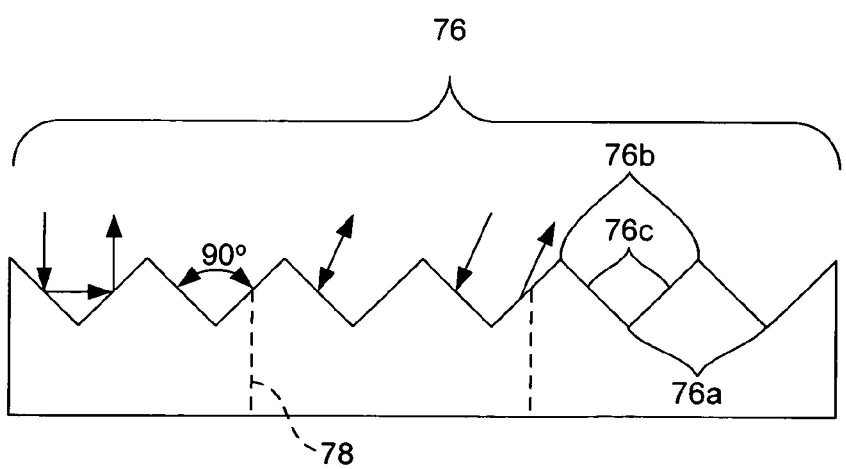

FIGS. 4A and 4B are plan and end views respectively of an aperture plate 74 having an aperture opening 78 according to another embodiment of the invention. The aperture plate 74 is similar to the plate 24 of FIGS. 2 and 3 except that the surface channels have a different shape. Specifically, the aperture plate 74 has an array of contiguous V-shaped channels 76 having valleys 76*a* and peaks 76*b* connected by pairs of symmetrical, orthogonal sidewalls 76*c*. Peripheral light from the beam 54 (FIG. 3) striking the aperture plate 74 beyond the opening 78 is deflected away from the image (the screen 58 of FIG. 3) regardless of the angle of incidence of the peripheral light as discussed above in conjunction with FIGS. 2 and 3.

Figure 5B:
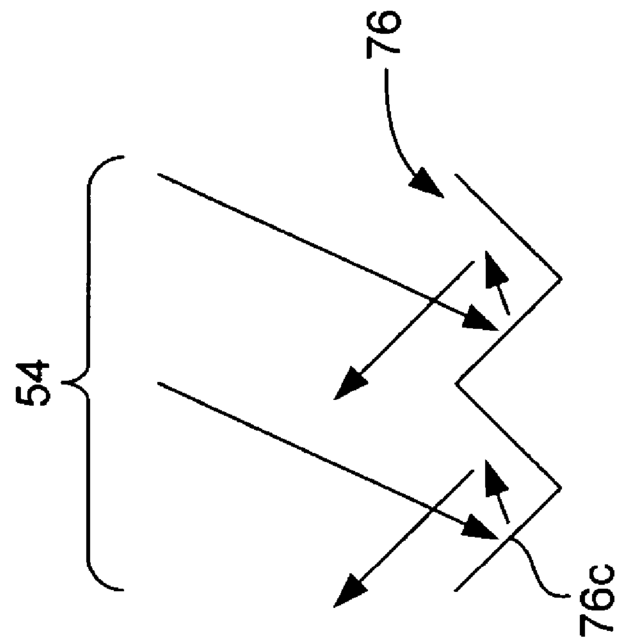
FIGS. 5A and 5B are related diagrammatic illustrations of how unwanted peripheral light is reflected away from the scanned field of view by an aperture plate similar to that of FIGS. 4A and 4B but with different channel angles.
Figure 5A:
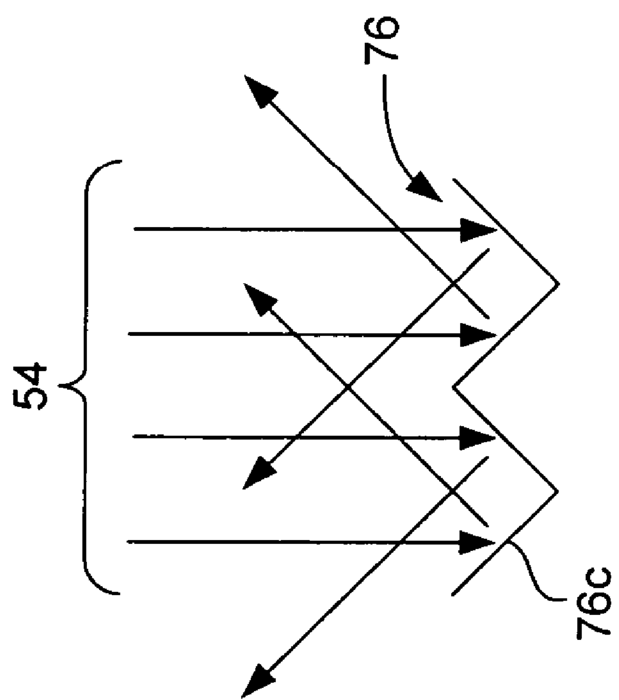

Referring to FIGS. 5A and 5B, one can change the angle at which the channel sidewalls 76*c* meet, and the aperture plate 74 still deflects peripheral light away from the image, as long as none of the sidewalls 78*c* are parallel to any plane that the mirror 34 (FIG. 3) rotates through while sweeping the beam 54.

Figure 6:
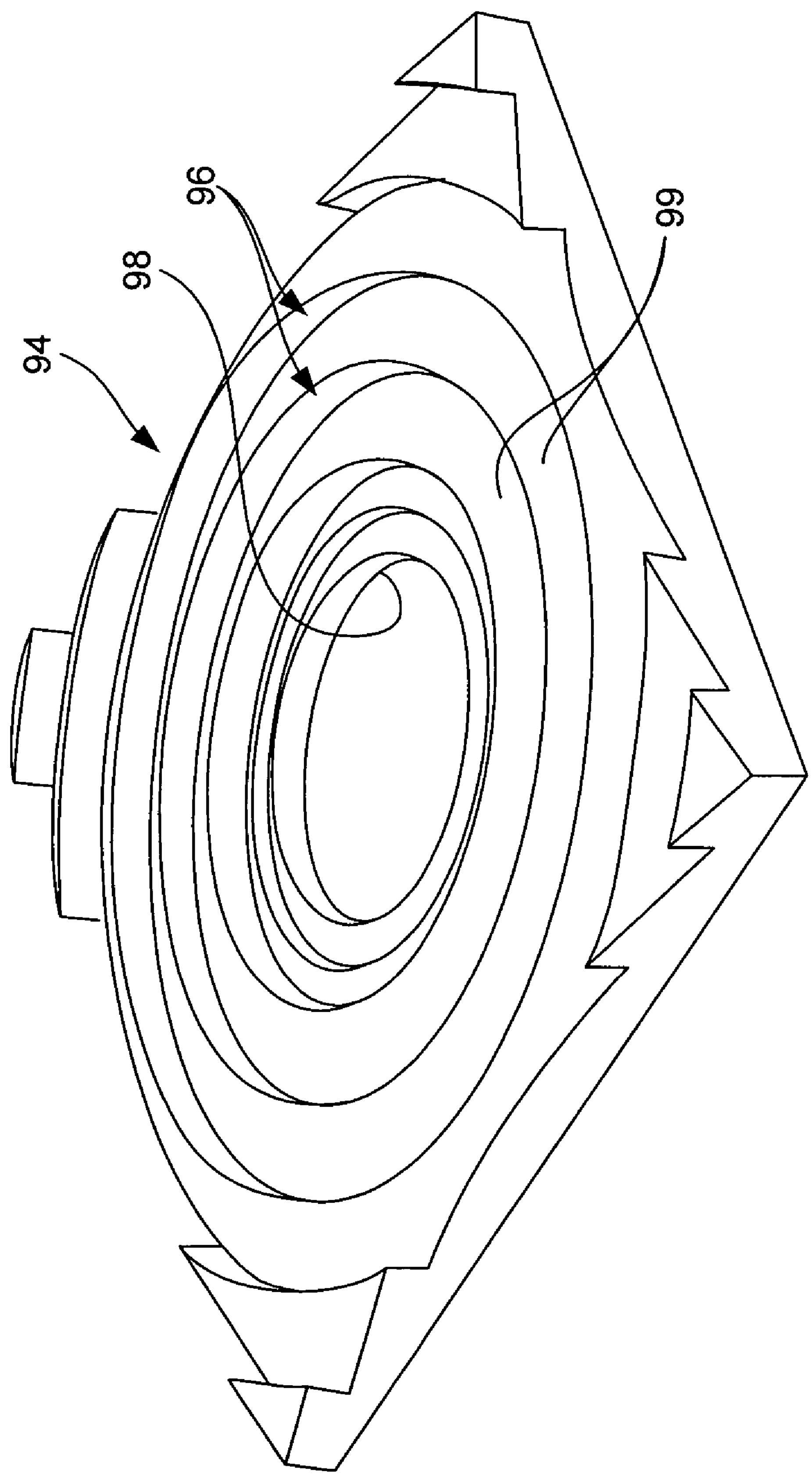
FIG. 6 is an isometric view of an aperture plate according to another embodiment of the invention.

FIG. 6 is a perspective view of an aperture plate 94 in accordance with another embodiment of the invention. The plate 94 has annular channels 96 that are concentric with an aperture opening 98. Other than being annular and having annular sidewalls 99, the channels 98 can have the cross-sectional shapes of the channels 26 of FIGS. 2 and 3, the channels 76 of FIGS. 4 and 5, or any other shape suitable to deflect peripheral light away from the image. That is, in this embodiment, none of the sidewalls 99 lie in a plane parallel to any of the planes through which the mirror 34 rotates while sweeping the beam 54 (FIG. 3). The plate 94 may be made by injection molding of a suitable plastic and can enable a low-cost aperture plate that may be attached to a scan mirror housing such as the MEMS housing 38 of FIG. 2. Furthermore, the annular topology of the concentric channels 96 smoothly meets the boundary wall of the circular aperture opening 98 to provide a high-quality aperture edge definition. Referring to FIGS. 2-6, the ability to injection mold an aperture plate such as the plates 24, 74, and 94 affords flexibility of design in that many different shapes consistent with the above explanations can be readily designed and then molded to cause maximum deflection of peripheral light. Many optical plastics having known properties are available. Light absorbing dyes are likewise available for mixing with the raw plastic material before molding to increase the absorbing of the peripheral light, and thus reduce the reflection of the peripheral light, by the aperture plate.

Figure 7:
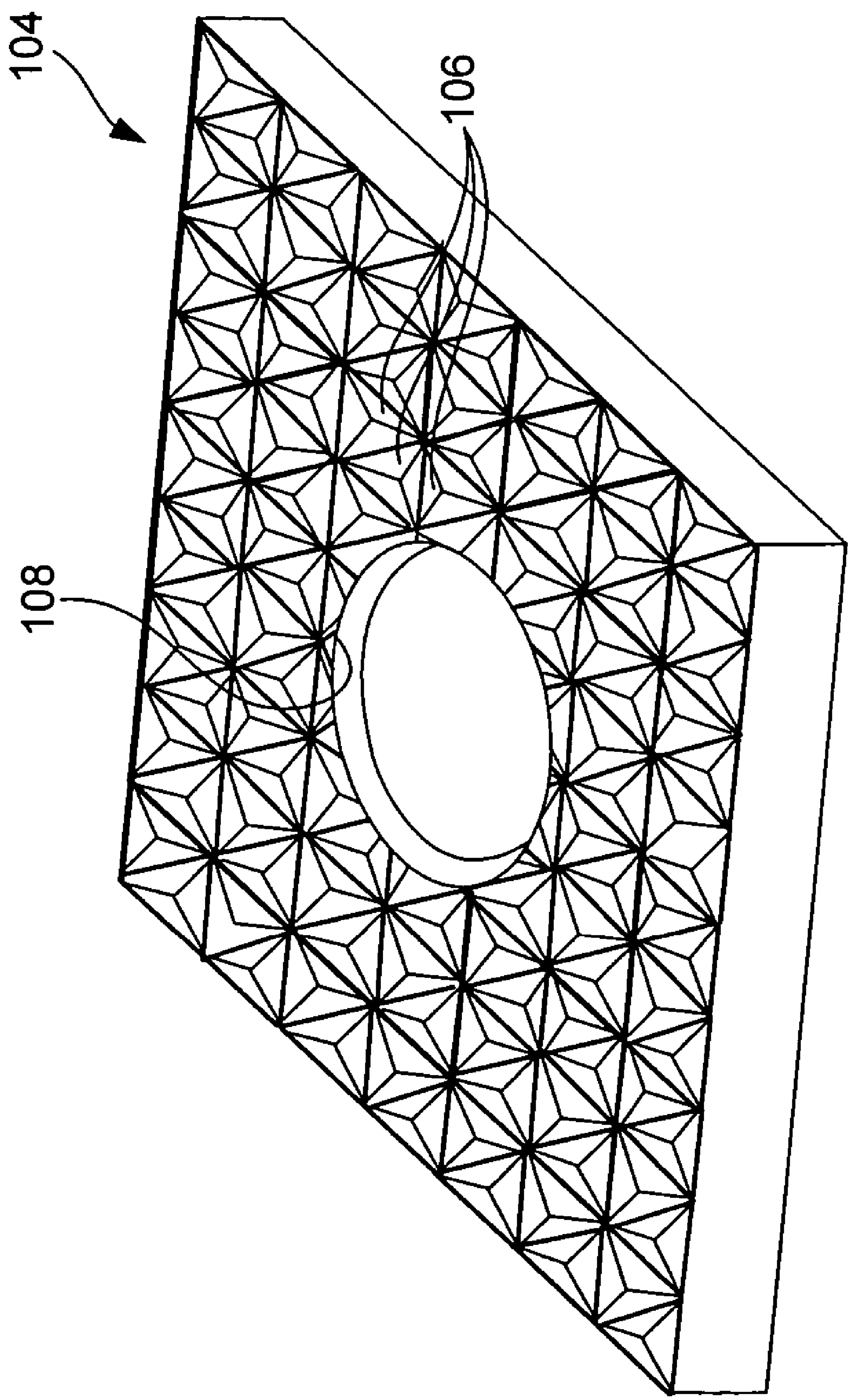
FIG. 7 is an isometric view of an aperture plate according to yet another embodiment of the invention.

FIG. 7 shows an aperture plate 104 according to yet another embodiment. The plate 104 is similar to the plates 24, 74, and 94 of FIGS. 2-6 except that instead of straight or annular channels, the plate 104 has an array of close packed three-face retroreflectors 106 formed in the surface structure surrounding the aperture opening 108. Each retroreflector has three mutually orthogonal faces so that multiple reflections of the peripheral beam light off these faces cause the peripheral light to be deflected back toward the source, and thus away from the image, independently of the angle of incidence of the incoming beam 54 (FIG. 3). The aperture plate 104 may be injection molded as discussed above in conjunction with FIG. 6, or other fabricating techniques may used as discussed above.

Figure 8:
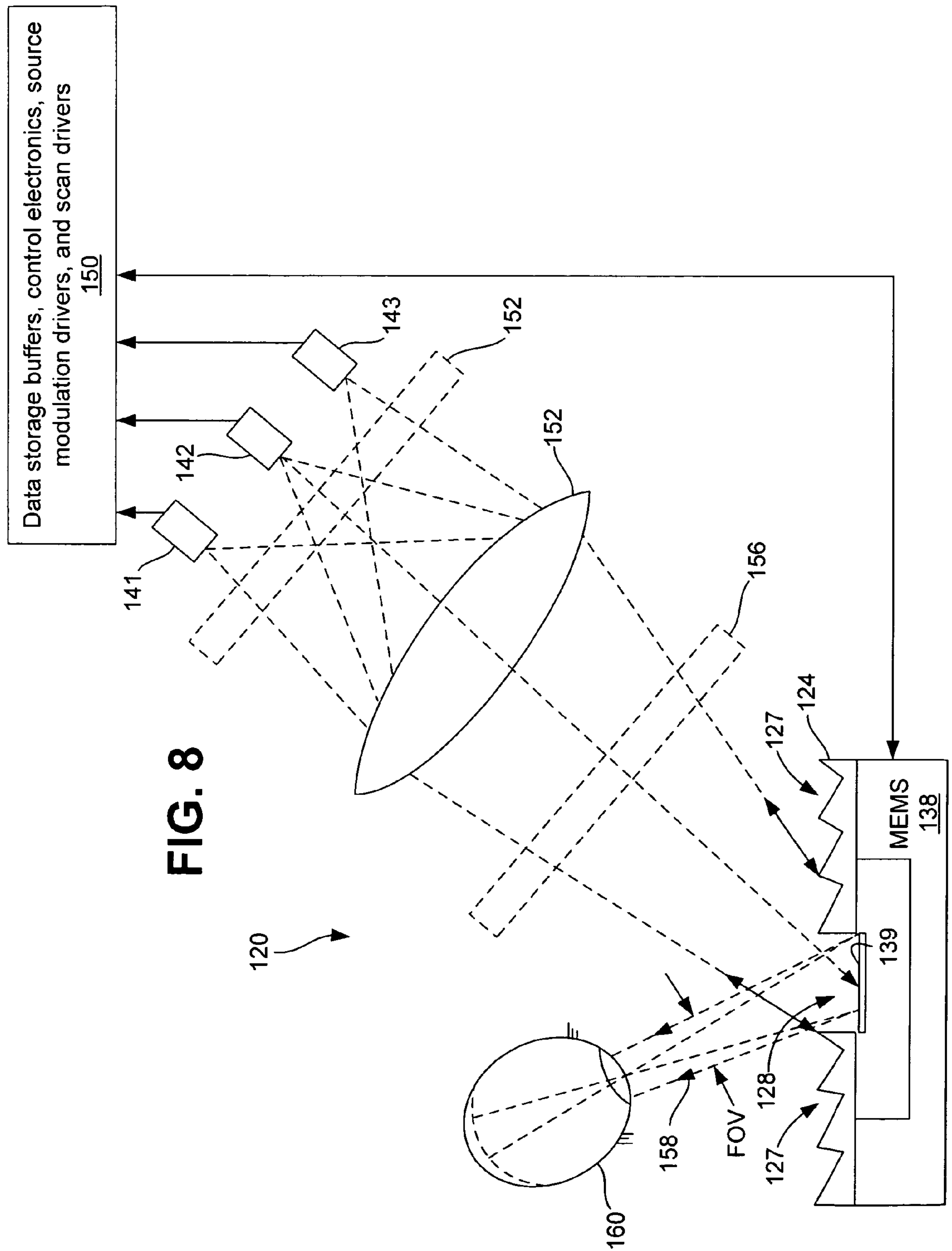
FIG. 8 is a diagrammatic illustration of an embodiment of the invention employing an aperture plate and scanning mirror in a multiple-light-source color VRD system.

Referring to FIG. 8 a scanning beam display system 120 has an aperture plate 124 with channels 127 mounted on the top of a MEMS mirror housing 138 according to an embodiment of the invention. The plate 124 deflects peripheral light away from a viewer's eye 160, and may be similar to one of the aperture plates 24, 74, 94, and 104 of FIGS. 2-7, respectively. The system 120 is a color retinal scanner and further includes a plurality of light source LEDs 141, 142 and 143 of different wavelengths (e.g., red, green, and blue) for generating separate scan beams. The resulting scanned image is perceived as a mixture of wavelengths in the viewer's eye 160, thus appearing as a full-color image. Modulating the LEDs 141, 142 and 143 are electronics 150 including data storage buffers, control circuitry and processors, and modulator drivers. The electronics 150 further include control and scan drivers for causing the periodic movement of bi-axial MEMS scan mirror 139. The electronics are known and are not therefore further described in detail. Optional apertures and/or baffles may be located at 154 and 156 to limit the amount of peripheral beam light that strikes the aperture plate 124. Beam forming optics such as one or more lenses 152 form and direct the resulting source beams onto the MEMS scan mirror 139 through the opening 128 of the aperture plate 124, and a reflected scan beam 158 is projected into a viewer's eye 160. Scanning motion and modulation of the sources 141, 142, and 143 create what the viewer perceives as an image. The channels 127 on the body of the aperture 124 adjacent the aperture opening 128 deflect peripheral light away from the eye 160, thus substantially eliminating artifacts and thus enhancing resolution of the perceived image. While this exemplary embodiment scans directly into the viewer's eye 160, in some applications, the beam may scan onto an intermediate element, such as a screen or exit pupil expander, and/or may be coupled to the eye with an optical train.

Still referring to FIG. 8, although three LEDs 141, 142, and 143 are shown, the display system 120 may include more or fewer than three LEDs. For example, the system 120 may include multiple red LEDs from which the lens 152 forms respective red scan beams, multiple green LEDs from which the lens forms respective green scan beams, and multiple blue LEDs from which the lens forms respective blue scan beams.

In the preceding detailed description, the invention is described with reference to specific embodiments. It will, however, be evident that various modifications and changes may be made thereto without departing from the broader spirit and scope of the invention. The specification and drawings are, accordingly, to be regarded in an illustrative rather than a restrictive sense. For example, although the above embodiments disclose scanned displays, the aperture structure at the scan mirror is also used to advantage in scan imagers. In such an imager, the scanned beam having peripheral source reflection reduced or eliminated by the surface structure around the aperture opening, illuminates an object and light reflected from the object is sensed by photodetectors and stored. Additionally, although there are descriptions of some specific materials and particular structures, such descriptions merely provide suitable examples and are not intended as a limitation. Other scanning approaches may also use the above aperturing at the scan mirror, including acousto-optic scanners, electro-optic scanners, spinning polygons, or some combinations thereof and successive single axis MEMS mirrors to cause in combination the fast and slow axes of a raster. In general, placing the aperture plate at the mirror is used to advantage in many types of mirror scanning apparatus where it is difficult to place beam blocking apertures at the beam source. Thus other adaptations and combinations of features of the embodiments disclosed are within the scope of the invention. Furthermore, the aperture plate may be used in other optics and non-optic applications such as in cameras and telescopes.

What is claimed is:

1. A scanner, comprising:

a scanning mirror formed in a planar structure for sweeping a beam of light to generate an image; and a planar structure defining an aperture opening lying over and parallel to the planar structure of the scanning mirror, operable to pass a main portion of the beam to and from the mirror, the structure having a surface that reflects other portions of the beam preferentially along at least one selected axis away from the image.

2. The scanner of claim 1 wherein the surface of the structure surrounds the aperture opening and includes channels.

3. The scanner of claim 1 wherein the surface of the structure surrounds the aperture opening and has an array of V-shaped channels.

4. The scanner of claim 1 wherein the surface surrounds the aperture opening and has an array of saw-tooth-shaped channels.

5. The scanner of claim 1 wherein the surface has an anti-reflective coating for other portions of the beam.

6. The scanner of claim 1 wherein the scanning mirror is substantially planar and the surface has generally flat surface areas oriented at a substantial angle to a resting-position plane of the mirror.

7. The scanner of claim 1 wherein the surface has V-shaped channels in which channel walls meet at an angle of substantially 90 degrees.

8. The scanner of claim 1 wherein the structure is molded plastic and the surface surrounding the aperture is grooved.

9. The scanner of claim 1 wherein the scanning mirror comprises a micro-electromechanical scanning mirror.

10. A scan system, comprising:

a beam source having at least one light source and optics operable to collect light from the source and to form a source beam from the collected light;

a scan mirror operable to generate an image by sweeping the source beam; and an aperture opening through which the source beam passes to the scan mirror and the swept beam passes to the image, structure surrounding the aperture opening operable to deflect peripheral light from the source beam away from the image.

11. The scan system of claim 10, wherein the mirror is moveable biaxially to sweep the source beam in a raster pattern.

12. A scan system, comprising:

a plurality of light sources;

optics operable to collect light from the sources and to form respective source beams from the collected light;

a scan mirror operable to illuminate a field of view by sweeping the source beams; and an aperture plate having a surface and an aperture opening formed in the surface and through which the source beams pass to the scan mirror and the swept source beams pass to the field of view, the surface operable to deflect away from the field of view light that does not pass through the aperture opening.

13. The scan system of claim 12 wherein the multiple light sources include multiple red-light sources, multiple blue-light sources, and multiple green-light sources.

14. The scanner of claim 1 wherein the surface of the structure surrounds the aperture opening and comprises annular channels.

* * * * *